United States Patent [19]

Klayman et al.

[11] Patent Number: 5,841,864
[45] Date of Patent: Nov. 24, 1998

[54] APPARATUS AND METHOD FOR AUTHENTICATION AND SESSION KEY EXCHANGE IN A COMMUNICATION SYSTEM

[75] Inventors: Jeffrey T. Klayman, Mansfield, Mass.; Louis D. Finkelstein, Wheeling; Christopher L. Clanton, Forest Park, both of Ill.

[73] Assignee: Motorola Inc., Schaumburg, Ill.

[21] Appl. No.: 693,688

[22] Filed: Aug. 5, 1996

[51] Int. Cl.$^6$ .................................................. H04L 9/08
[52] U.S. Cl. .................... 380/21; 380/28; 380/44
[58] Field of Search ................. 380/20, 21, 23, 380/28, 42, 44, 45, 47

[56] References Cited

U.S. PATENT DOCUMENTS

| | | | |
|---|---|---|---|
| 4,200,770 | 4/1980 | Hellman et al. ...................... | 380/44 X |
| 4,203,166 | 5/1980 | Ersham et al. ............................ | 380/45 |
| 4,864,615 | 9/1989 | Bennet et al. ............................ | 380/21 |
| 4,888,801 | 12/1989 | Foster et al. . | |
| 4,993,067 | 2/1991 | Leopold . | |
| 5,029,207 | 7/1991 | Gammie .............................. | 380/21 X |
| 5,081,676 | 1/1992 | Chou et al. ........................ | 380/21 X |
| 5,177,791 | 1/1993 | Yeh et al. ................................. | 380/45 |
| 5,202,922 | 4/1993 | Lijima ...................................... | 380/45 |
| 5,220,603 | 6/1993 | Parker ....................................... | 380/21 |
| 5,249,230 | 9/1993 | Mihm, Jr. . | |
| 5,313,521 | 5/1994 | Torii et al. ................................ | 380/21 |
| 5,406,628 | 4/1995 | Beller et al. . | |
| 5,467,398 | 11/1995 | Pierce et al. .............................. | 380/44 |
| 5,517,567 | 5/1996 | Epstein ...................................... | 380/21 |
| 5,602,917 | 2/1997 | Mueller .................................... | 380/21 |
| 5,633,933 | 5/1997 | Aziz ..................................... | 380/21 X |

OTHER PUBLICATIONS

"Common Cryptographic Algorithms, Revision A," TR45.0.A; Telecommunications Industry Association, Engineering Deptment, Washington, D.C. p. 1–55; Dec. 1994.

Primary Examiner—Ronald L. Biegel
Assistant Examiner—Paul D. Amrozowicz
Attorney, Agent, or Firm—Nancy R. Gamburd; Jeffrey T. Klayman

[57] ABSTRACT

The apparatus (101, 110) and method for authentication is provided by generating R and encrypting it using a selected algorithm K as the key in a primary station, encrypting the verification key, V using R as the key and encrypting the result using K as the key, transmitting both pieces of information (VAR1 and VAR3) to the secondary station (110), using K to decrypt VAR1 and VAR3 to obtain R and eventually V which is encrypted using R in the secondary station (110)verifying authenticity of the primary station (101) if the decrypted V matches the secret key portion of V that is stored at the secondary station (110).

12 Claims, 3 Drawing Sheets

APPARATUS AND METHOD FOR AUTHENTICATION AND SESSION KEY EXCHANGE IN A COMMUNICATION SYSTEM

FIELD OF THE INVENTION

This invention relates, in general, to data communications and data communications systems and devices and, more specifically, to an apparatus and method for authentication and session key exchange in a communication system.

BACKGROUND OF THE INVENTION

With the advent of multimedia communications, data transmission has become increasingly complex. For example, multimedia communications applications such as real time transmission of digitally encoded video, voice, and other forms of data, may require new forms and systems for data communication and data transmission. One such new communication system is the CableComm™ System currently being developed by Motorola, Inc. In the CableComm™ System, a hybrid optical fiber and coaxial cable is utilized to provide substantial bandwidth over existing cable lines to secondary stations such as individual, subscriber access units, for example, households having new or pre-existing cable television capability. These coaxial cables are further connected to fiber optical cables to a central location having centralized, primary (or "head end") controllers or stations having receiving and transmitting capability. Such primary equipment may be connected to any variety of networks or other information sources, from the Internet, various on line services, telephone networks, to video/movie subscriber service. With the CableComm™ System, digital data may be transmitted both in the downstream direction, from the primary station or controller (connected to a network) to the secondary station of an individual user (subscriber access unit), and in the upstream direction, from the secondary station to the primary station (and to a network).

In the CableComm™ System, downstream data is currently intended to be transmitted using 64 quadrature amplitude modulation ("QAM") at a rate of 30M bps (megabits per second), at 5 M symbols/second utilizing 6 bits/symbol, over channels having 6 MHz bandwidth in the frequency spectrum of 50–750 MHz. Anticipating asymmetrical requirements with large amounts of data tending to be transmitted in the downstream direction rather than the upstream direction, less capacity is provided for upstream data transmission, using $\pi/4$ differential quadrature phase shift keying ($\pi/4$-DQPSK) modulation in the frequency band from 5–42 MHz with a symbol rate of 384 k symbols/sec with 2 bits/symbol. In addition, the communication system is designed to have a multipoint configuration, i.e., many end users (secondary stations, also referred to as subscriber access units) transmitting upstream to a primary station, with one or more primary stations transmitting downstream to the secondary stations. The communication system is also designed for asynchronous transmission, with users transmitting and receiving packets of encoded data, such as video or text files. Such shared media communication systems are more vulnerable to particular attacks than point to point networks. These attacks include physically attaching an unauthorized secondary stations to the communication system for the purpose of obtaining free service and obtaining private or sensitive information by unauthorized users. Accordingly, there is a need to provide for secure communication for systems such as the cableComm™ system. Specifically, there is a need for authentication and key exchange request that will provide for secure communication.

DETAILED DESCRIPTION OF THE INVENTION

As mentioned above, a need has remained to provide for authentication and key exchange request for emerging multipoint communications systems, such as the CableComm™ system.

Figure 1:
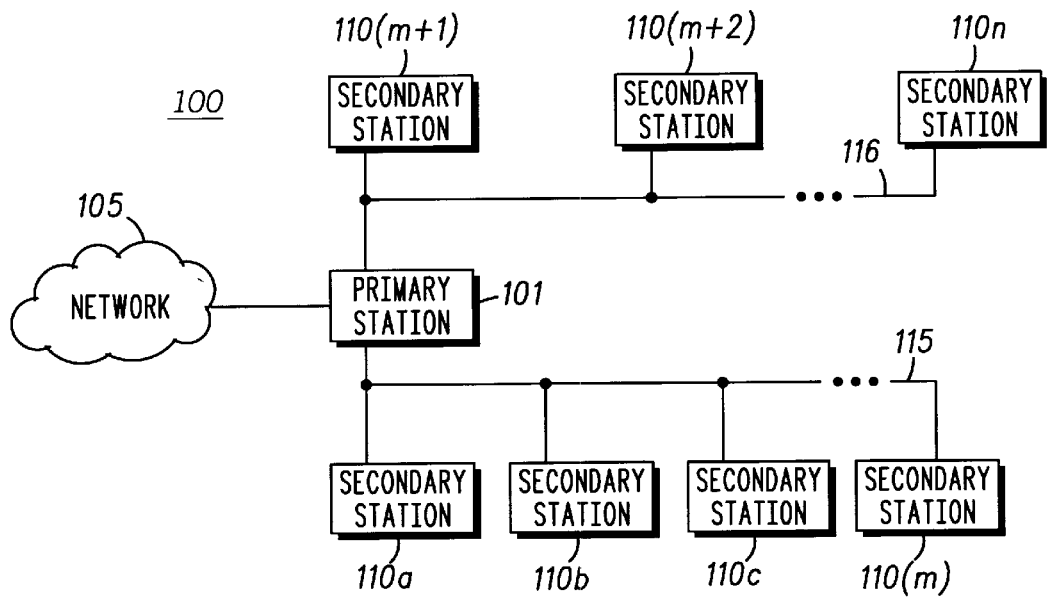
FIG. 1 is a block diagram illustrating a communication system in accordance with the present invention.

FIG. 1 is a block diagram illustrating a communication system 100 in accordance with the present invention, such as a multipoint communication system. As illustrated in FIG. 1, a primary station 101, also referred to as a primary transceiver unit 101, is coupled to a plurality of secondary stations 110$_a$ through 110$_n$, via communication media 115 and 116. In the preferred embodiment, communication media 115 and 116 are hybrid optical fiber and coaxial cable. In other embodiments, the communication media may be coaxial cable, fiber optic cable, twisted pair wires, and so on, and may also include air, atmosphere or space for wireless and satellite communication. The primary station 101 is also coupled to a network 105, which may include networks such as the Internet, on line services, telephone and cable networks, and other communication systems. The secondary stations 110$_a$ through 110$_n$ are illustrated in FIG. 1 as connected to the primary station 101 on two segments or branches of a communication medium, such as communication media 115 and 116. Equivalently, the secondary stations 110$_a$ through 110$_n$ may be connected to more than one primary station, and may be connected to a primary station (such as primary station 101) utilizing more or fewer branches, segments or sections of any communication medium. Continuing to refer to FIG. 1, in the preferred embodiment, the communication medium, such as communication media 115 and 116, has or supports a plurality of communication channels. For ease of reference, the communication channels in which a primary station, such as the primary station 101, transmits information, signals, or other data to a secondary station, such as secondary station 110$_n$, are referred to as downstream channels or downstream communication channels. Also for ease of reference, the communication channels in which a secondary station, such as secondary station 110$_n$, transmits information, signals, or other data to a primary station, such as primary station 101, are referred to as upstream channels or upstream communication channels. These various upstream and downstream channels may, of course, be the same physical channel or may be separate physical channels, for example, through time division multiplexing or frequency division multiplexing. These various channels may also be logically divided in other ways, in addition to upstream and downstream directions. As mentioned above, in the preferred embodiment of the CableComm™ System, the communication medium is hybrid fiber coaxial cable, with downstream channels in the frequency spectrum of 50–750 MHz, and with upstream channels in the frequency band from 5–42 MHz.

Figure 2:
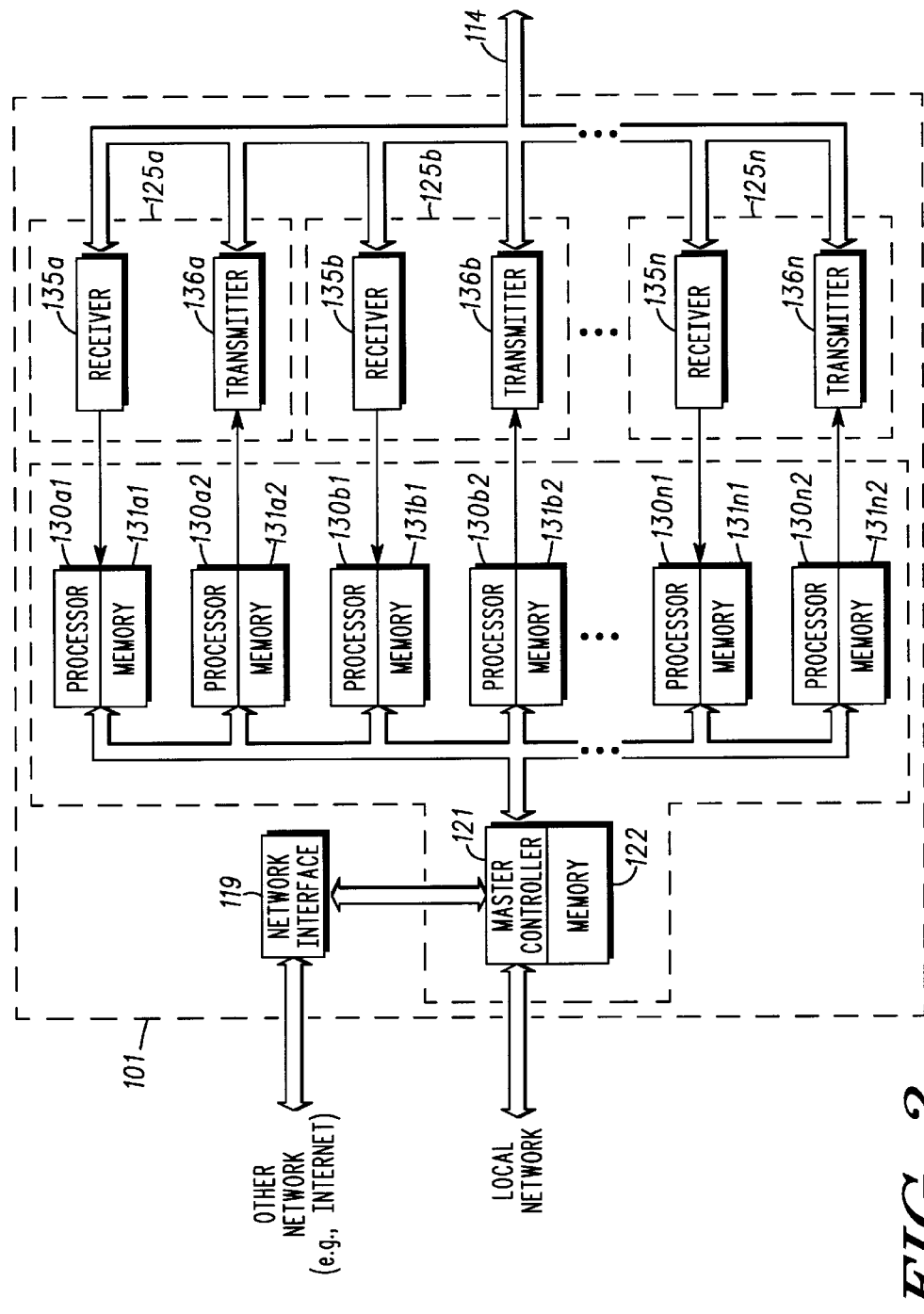
FIG. 2 is a block diagram illustrating a primary station apparatus in accordance with the present invention.

FIG. 2 is a block diagram illustrating a primary station 101 in accordance with the present invention. The primary station 101 (also referred to as a primary transceiver) is coupled to a communication medium 114 for upstream and downstream communication to one or more secondary stations (not illustrated), and is coupleable to a network, such as the Internet, through a network interface 119. The primary station includes a processor arrangement 120 which is connected to a plurality of channel interfaces, channel interface $125_a$ through channel interface $125_n$, for communication over the communication medium 114. The processor arrangement 120 includes a master controller 121 having or connected to memory 122, and one or more additional processors $130_{a1}$ through $130_{n2}$ and corresponding associated memories $131_{a1}$ through $131_{n2}$. In the preferred embodiment, the master controller 121 is a Motorola M68040 processor, and the memory 122 is 16 MB RAM. The master controller 121 performs a variety of higher level functions in the preferred embodiment, such as the spectrum management of the present invention, plus other functions such as routing, management of secondary stations, and communication protocol management (such as SNMP management). The master controller 121 is connected to a plurality of other processors, collectively referred to as processors 130 and separately illustrated as processor $130_{a1}$, processor $130_{a2}$, through processor $130_{n1}$ and processor $130_{n2}$. Each of these processors, processor $130_{a1}$, processor $130_{a2}$, through processor $130_{n1}$ and processor $130_{n2}$, is also coupled to or contains corresponding memory circuits, memory $131_{a1}$, memory $131_{a2}$, through memory $131_{n1}$ and memory $131_{n2}$. In the preferred embodiment, each of these processors 130 are also Motorola M68040 processors, while the corresponding memory circuits, memory $131_{a1}$ through memory $131_{n2}$, are 4 MB RAM. In the preferred embodiment, the processors 130 perform such functions related to upstream and downstream data protocols, such as sending a poll message or an acknowledgment message downstream. Each of these processors $130_{a1}$ through $130_{n2}$ of the processor arrangement 120 are connected to corresponding receivers and transmitters of the channel interfaces, channel interface $125_a$ through channel interface $125_n$ (collectively referred to as channel interfaces 125), namely, receiver $135_a$ through receiver $135_n$ (collectively referred to as receivers 135) and transmitter $136_a$ through transmitter $136_n$ (collectively referred to as transmitters 136). In the preferred embodiment, depending upon the functions implemented, each of the receivers $135_a$ through $135_n$ may include a Motorola M68302 processor, a Motorola 56000 series digital signal processor, a ZIF SYN integrated circuit, and an LSI Logic L64714(Reed-Solomon decoder), for demodulation and for decoding forward error correction and cyclic redundancy checks. In the preferred embodiment, also depending upon the functions implemented, each of the transmitters $136_a$ through $136_n$ may include a Motorola M68302 processor, a Motorola 56000 series digital signal processor, a ZIF SYN integrated circuit, and an LSI Logic L64711 (Reed-Solomon encoder), for modulation and for coding for forward error correction and cyclic redundancy checks. As a consequence, as used herein, the channel interfaces 125 may be considered to perform the functions of data and other signal reception and transmission, regardless of the specific hardware implementations and additional functions which may or may not be implemented. The various memories illustrated, such as memory 122 or $131_{a1}$, may also be embodied or contained within their corresponding processors, such as master controller 121 or processor $130_{a1}$. The functions of these various components with respect to the present invention are explained in greater detail below with reference to FIG. 4.

In the preferred apparatus embodiment illustrated in FIG. 2, the authentication and key exchange method discussed below with reference to FIG. 4 may be programmed and stored, as a set of program instructions for subsequent execution, in the processor arrangement 120, and more particularly, in the master controller 121 and its associated memory 122 of a primary station, such as primary station 101 illustrated in FIG. 2. Information from secondary stations, which are discussed below with reference to FIG. 3, such as downstream channel bit error and packet error rates, may be obtained from forward error correction encoders and/or decoders, such as the LSI Logic L64711 and L64714 integrated circuits, included in the channel interface circuit 160. Similar information for upstream channel bit error and packet error rates may be obtained from forward error correction encoders and/or decoders, such as the LSI Logic L64711 and L64714 integrated circuits, included in the channel interface circuits 125.

Figure 3:
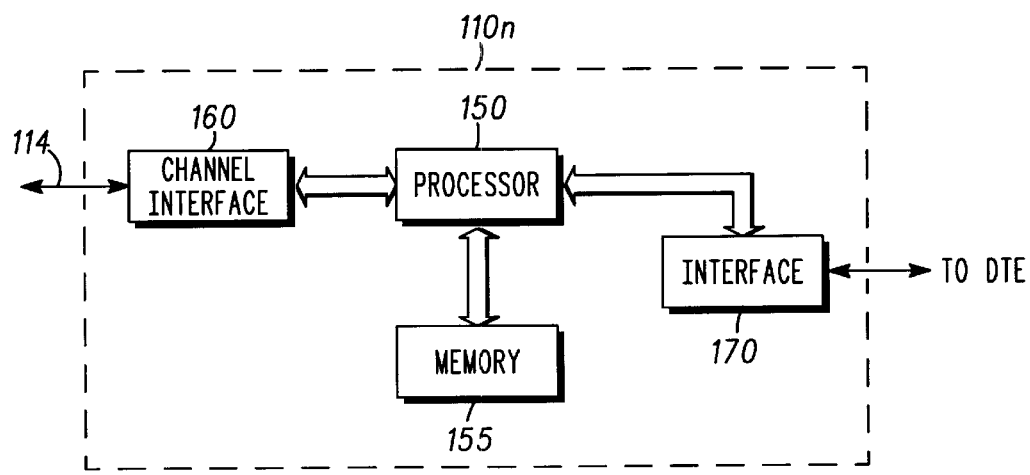
FIG. 3 is a block diagram illustrating a secondary station apparatus in accordance with the present invention.

FIG. 3 is a block diagram illustrating a secondary station $110_n$ in accordance with the present invention. The secondary station $110_n$ includes a processor 150, with the processor 150 having or coupled to a memory 155. In the preferred embodiment, the processor 150 is a Motorola M68302 processor (also known as an integrated multiprotocol processor), and the memory 155 is 256K RAM. The processor 150 is coupled to an interface 170, such as an ethernet port or an RS232 interface, for connection to a computer, a workstation, or other data terminal equipment. The processor 150 is also coupled to a channel interface 160 for communication over the communication medium 114. The channel interface 160, in the preferred embodiment, depending upon the functions implemented, includes a Motorola M68HC11 integrated circuit, a ZIF SYN integrated circuit, a Broadcom BCM3100 QAMLink integrated circuit, a Motorola TxMod integrated circuit, and LSI Logic L64711 and L64714 integrated circuits, and performs such functions as forward error correction encoding and decoding, QAM demodulation (for downstream reception), π/4-DQPSK modulation (for upstream transmission), transmit level and frequency adjustment, for data and other signal reception and transmission. As a consequence, as used herein, the channel interface 160 may be considered to perform the functions of data and other signal reception and transmission, regardless of the specific hardware implementations and additional functions which may or may not be implemented. The memory illustrated as memory 155 may also be embodied or contained within the corresponding processor 150. The additional functions of these components of the secondary station $110_n$ with respect to the invention are also described in greater detail below with reference to FIG. 4.

As discussed in greater detail below, the apparatus and method of the present invention provides for a secure communication.

Figure 4:
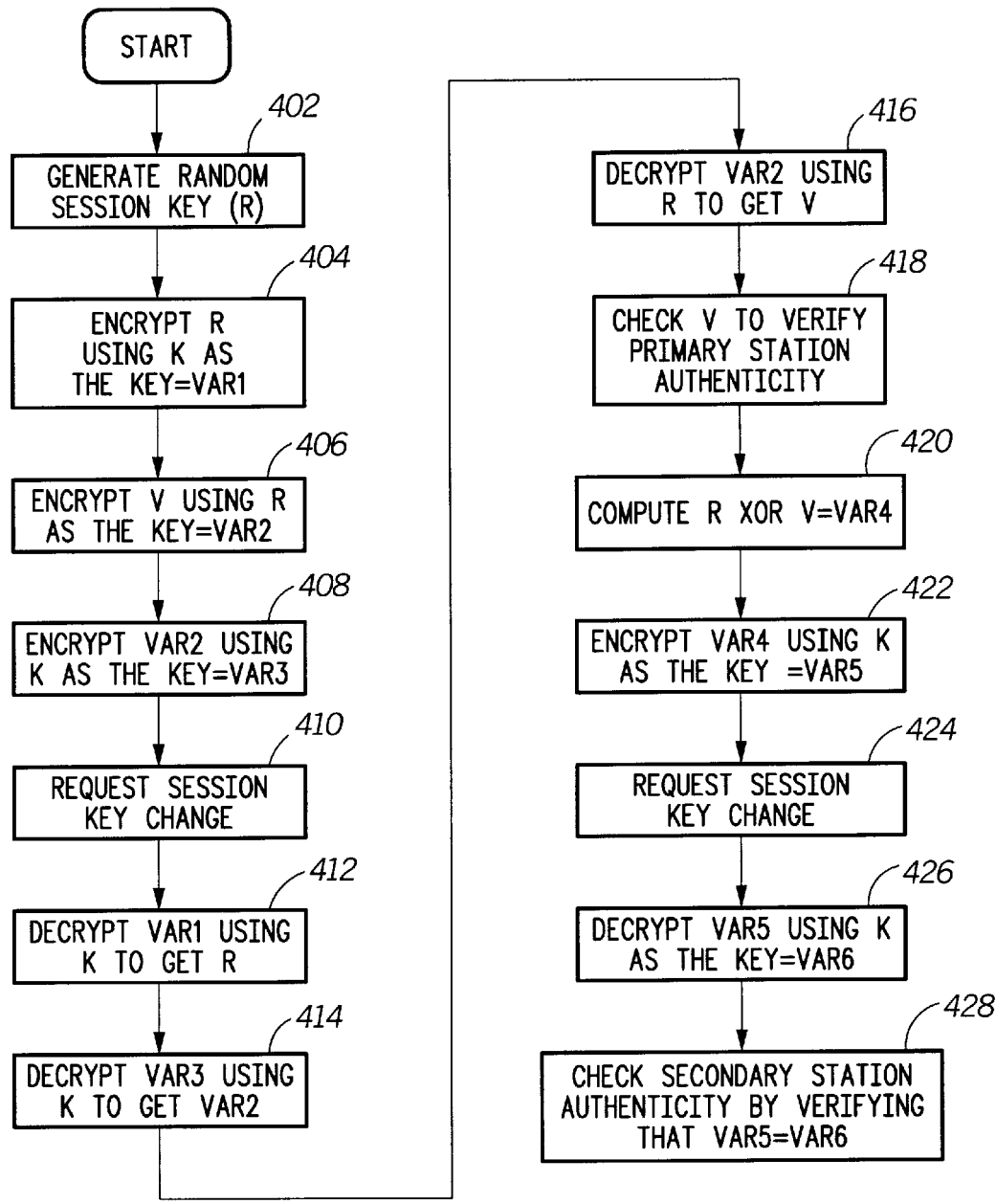
FIG. 4 is a flow chart illustrating authentication and key exchange request in accordance with the present invention.

FIG. 4 is a flow chart illustrating authentication and session key exchange in accordance with the present invention.

At step 402, the primary station 101 generates a first key also referred to as a random session key. At step 404, the random access key is encrypted using K, a first portion of a secret key which results in a second key VAR1. The secret key is generated using Diffie-Hellman key exchange between the primary station 101 and the secondary station (110) sometime prior to step 404. K is a 64 bit key in the preferred embodiment of the invention. A verification key, V is encrypted using R as the key which results in a third key VAR2 at step 406. V is a 64 bit second portion of the secret key different from the first 64 bit portion of the secret key used for K. At step 408 VAR2 is encrypted using K as the ken which results in a fourth key, VAR3. The primary station 101 requests a session key change from the secondary station (110) at step 410 and transmits VAR1 and VAR3. At step 412, the secondary station (110) receives the session key request, receives the keys VAR1 and VAR3, and decrypts VAR 1 using K to get R. At step 414, the secondary station (110) decrypts VAR3 using K to get VAR2. At step 416, VAR2 is decrypted using R to get V. V is compared to the 64 bit portion of the secret key corresponding to V to verify the authenticity of the station 101 at step 418. A fifth key VAR4, is computed by performing a exclusive OR function on R and V at step 420. VAR4 is encrypted using K as the key to produce a sixth key, VAR5 at step 422. The secondary station (110) sends a session key change response and VAR5, to the station 101 at step 424. The station 101 decrypts VAR5 using K as the key to produce a VAR 6. The station 101 compares VAR 6 to the value produced by performing an exclusive OR function on R and V at step 428. If the VAR6 is the same as the value produced by the exclusive OR, authenticity of the secondary station (110) is verified.

In summary, the station 101 generates R and encrypts it using a selected algorithm K as the key. K and V are both portions of a secret key that is established by the primary and secondary station (110)s at some earlier time. The station 101 then encrypts the verification key V using R as the key and encrypts the result using K as the key. Both pieces of information (VAR1 and VAR3) are transmitted to the secondary station (110). Since the secondary station (110) knows the secret key and therefore knows K, the secondary station (110) uses K to decrypt VAR1 and VAR3 to obtain R and eventually V which is encrypted using R. Authenticity of the station 101 is verified if the decrypted V matches the secret key portion of V that is stored at the secondary station (110). The secondary station (110) then transmits the result of the exclusive OR of R and V encrypted using K back to the station 101. The station 101 uses K and R to decrypt the message and recover V. If the recovered V is the same as the portion of its version of the secret key, the authenticity of the secondary station (110) is verified.

Therefore, a secure communication system is achieved which is resistant to eavesdroppers and those persons attempting to obtain free service by providing a method of authentication and session key exchange.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method for authentication and session key exchange between a first station and a second station over a communication medium, the method comprising the steps of:

establishing a secret key shared by both the first station and the second station;

generating, by the first station, a first key (R);

encrypting, by the first station, the first key (R) using a first portion (K) of the secret key to form a second key (VAR1);

encrypting, by the first station, a second portion (V) of the secret key using the first key (R) to form a third key (VAR2);

encrypting, by the first station, the third key (VAR2) using the first portion (K) of the secret key to form a fourth key (VAR3); and sending, by the first station to the second station, the second key (VAR1) and the fourth key (VAR3).

2. The method of claim 1 further comprising the steps of:

receiving, by the second station, a first encrypted value (VAR1) and a second encrypted value (VAR3);

decrypting, by the second station, the first encrypted value (VAR1) using the first portion (K) of the secret key to recover a first decrypted value;

decrypting, by the second station, the second encrypted value (VAR3) using the first portion (K) of the secret key to recover a second decrypted value;

decrypting, by the second station, the second decrypted value using the first decrypted value to recover a third decrypted value; and comparing, by the second station, the third decrypted value to the second portion (V) of the secret key to determine whether the first decrypted value is equal to the first key (R).

3. The method of claim 2 further comprising the steps of:

computing, by the second station, a fifth key (VAR4) equal to the logical exclusive OR of the first decrypted value and the second portion (V) of the secret key;

encrypting, by the second station, the fifth key (VAR4) using the first portion (K) of the secret key to form a sixth key (VAR5); and transmitting, by the second station to the first station, the sixth key (VAR5).

4. The method of claim 3 further comprising the steps of:

receiving, by the first station, a third encrypted value (VAR5);

decrypting, by the first station, the third encrypted value (VAR5) using the first portion (K) of the secret key to recover a fourth decrypted value (VAR6); and determining, by the first station, whether the fourth decrypted value (VAR6) is equal to the logical exclusive OR of the first key (R) and the second portion (V) of the secret key.

5. In a communication system having a first station in communication with a second station over a communication medium, the first station comprising:

logic for establishing a secret key shared by both the first station and the second station;

logic for generating a first key (R);

logic for encrypting the first key (R) using a first portion (K) of the secret key to form a second key (VAR1);

logic for encrypting a second portion (V) of the secret key using the first key (R) to form a third key (VAR2);

logic for encrypting the third key (VAR2) using the first portion (K) of the secret key to form a fourth key (VAR3); and logic for sending the second key (VAR1) and the fourth key (VAR3).

6. The first station of claim 5 further comprising:

logic for receiving a first encrypted value (VAR5);

logic for decrypting the first encrypted value (VAR5) using the first portion (K) of the secret key to recover a first decrypted value (VAR6); and logic for determining whether the first decrypted value (VAR6) is equal to the logical exclusive OR of the first key (R) and the second portion (V) of the secret key.

7. An apparatus comprising a computer readable medium having computer readable program code means embodied therein for authentication and session key exchange, the computer readable program code means comprising:

- computer readable program code means for establishing a secret key shared by both the first station and the second station;
- computer readable program code means for generating a first key (R);
- computer readable program code means for encrypting the first key (R) using a first portion (K) of the secret key to form a second key (VAR1);
- computer readable program code means for encrypting a second portion (V) of the secret key using the first key (R) to form a third key (VAR2);
- computer readable program code means for encrypting the third key (VAR2) using the first portion (K) of the secret key to form a fourth key (VAR3); and
- computer readable program code means for sending the second key (VAR1) and the fourth key (VAR3).

8. The apparatus of claim 7 further comprising:

- computer readable program code means for receiving a first encrypted value (VAR5);
- computer readable program code means for decrypting the first encrypted value (VAR5) using the first portion (K) of the secret key to recover a first decrypted value (VAR6); and
- computer readable program code means for determining whether the first decrypted value (VAR6) is equal to the logical exclusive OR of the first key (R) and the second portion (V) of the secret key.

9. In a communication system having a first station in communication with a second station over a communication medium, the second station comprising:

- logic for establishing a secret key shared by both the first station and the second station;
- logic for receiving a first encrypted value (VAR1) and a second encrypted value (VAR3);
- logic for decrypting the first encrypted value (VAR1) using a first portion (K) of the secret key to recover a first decrypted value;
- logic for decrypting the second encrypted value (VAR3) using the first portion (K) of the secret key to recover a second decrypted value;
- logic for decrypting the second decrypted value using the first decrypted value to recover a third decrypted value; and
- logic for comparing the third decrypted value to a second portion (V) of the secret key to determine whether the first decrypted value is equal to a first key (R).

10. The second station of claim 9 further comprising:

- logic for computing a fifth key (VAR4) equal to the logical exclusive OR of the first decrypted value and the second portion (V) of the secret key;
- logic for encrypting the fifth key (VAR4) using the first portion (K) of the secret key to form a sixth key (VAR5); and
- logic for transmitting the sixth key (VAR5).

11. An apparatus comprising a computer readable medium having computer readable program code means embodied therein for authentication and session key exchange, the computer readable program code means comprising:

- computer readable program code means for establishing a secret key shared by both the first station and the second station;
- computer readable program code means for receiving a first encrypted value (VAR1) and a second encrypted value (VAR3);
- computer readable program code means for decrypting the first encrypted value (VAR1) using a first portion (K) of the secret key to recover a first decrypted value;
- computer readable program code means for decrypting the second encrypted value (VAR3) using the first portion (K) of the secret key to recover a second decrypted value;
- computer readable program code means for decrypting the second decrypted value using the first decrypted value to recover a third decrypted value; and
- computer readable program code means for comparing the third decrypted value to a second portion (V) of the secret key to determine whether the first decrypted value is equal to a first key (R).

12. The apparatus of claim 11 further comprising:

- computer readable program code means for computing a fifth key (VAR4) equal to the logical exclusive OR of the first decrypted value and the second portion (V) of the secret key;
- computer readable program code means for encrypting the fifth key (VAR4) using the first portion (K) of the secret key to form a sixth key (VAR5); and
- computer readable program code means for transmitting the sixth key (VAR5).

* * * * *